United States Patent Office 2,846,147
Patented Aug. 5, 1958

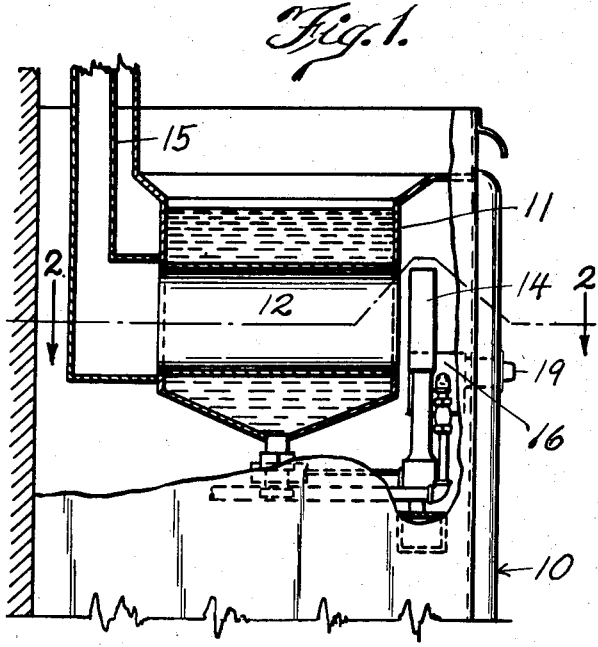
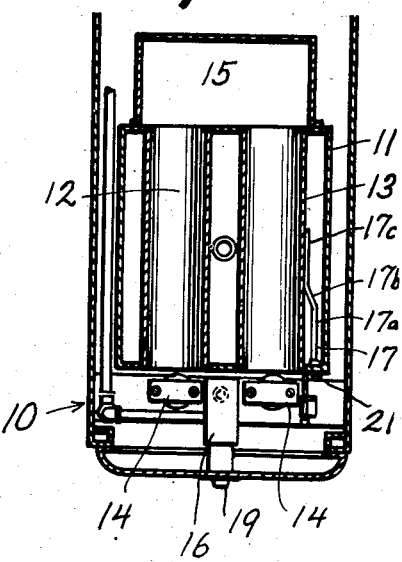
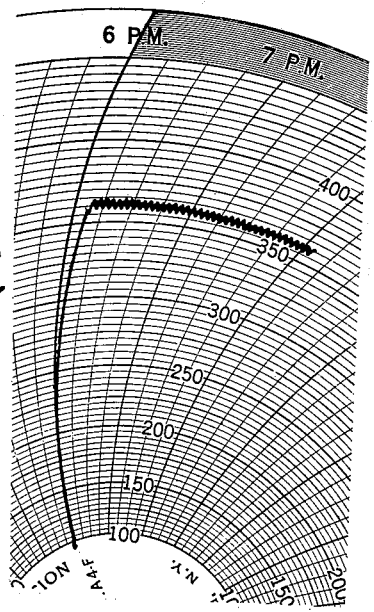
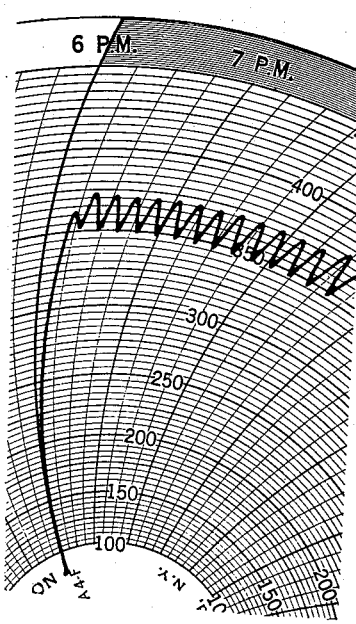

2,846,147

NARROW RANGE THERMOSTAT

Richard T. Keating, Oak Park, Ill.

Application February 16, 1956, Serial No. 565,965

2 Claims. (Cl. 236—32)

This invention relates to thermostatic control devices and has specific reference to thermostatic heat controls designed for deep fryers and other equipment wherein the rate of heat input is extremely high.

A specific object of the invention is the provision of an improved thermostatic control designed to maintain the desired cooking temperature within an unusually narrow range, even in fryers capable of extremely rapid preheating.

A still further object of the invention is the provision of a thermostatic control apparatus wherein the thermostat is not solely controlled by the temperature of the fluid being heated, but is also directly controlled by heat from the heating source.

A further object of the invention resides in the provision of a thermostatic heat control device wherein the range of temperature variation in the medium to be controlled may be held within limits far less than the difference between the rated opening and closing temperatures of the thermostatic unit employed.

A still further object of the invention resides in the provision of a thermostatic heat control wherein the time lag ordinarily encountered in thermostatic control devices is reduced to a minimum, and wherein "cycling" or "hunting" of the thermostat during the preheating period of the apparatus is eliminated. A further object is to prevent the "overshoot" customarily encountered in many types of equipment, wherein the temperature to be controlled continues to rise substantially after actual closing of the thermostat and continues to fall substantially after opening thereof.

While the present invention is believed to be applicable to various high input heating devices such as ovens, furnaces, roasters, degreasing apparatus and similar applications, yet its principles are particularly applicable to deep fryers designed for preparation of fried foods. The invention will accordingly be described in connection with the latter application.

In introduction, it should be pointed out that while thermostatic control of temperatures in rooms, ovens, fryers or other heated enclosures has been practiced for many years, yet the problem of maintaining accurate and constant temperature in high input devices has been a continuing one, presenting problems not at all parallel to the problems encountered in applications where the rate of heat input is comparatively low. Thus, while it has become commonplace to maintain temperature variations within a range of a very few degrees in some low input types of apparatus, yet in devices such as deep fryers, temperature variations of less than 20 to 35 degrees have been quite uncommon and difficult to accomplish, even with the most accurate, precise and reliable thermostatic controls available on the commercial market at the present time.

It has long since been recognized that there is a rather well defined optimum temperature for cooking of any given food, and it therefore is important to reduce the range of temperature variation in equipment of this type since proper cooking of foods is a prime consideration in any restaurant or similar establishment. Temperatures under the optimum require an unnecessarily long cooking time and result in excessive absorption of cooking oils in the food. Temperatures above the optimum tend to overcook the surface of the food before it is cooked through, and also cause unduly rapid chemical breakdown of the cooking oils. This results in discoloration of the cooking vessel and increases the deterioration and discoloration of the food due to charring and carbonization of food particles. Nevertheless, it has heretofore been considered impractical to attempt to hold the temperature of the oil in a commercial deep fryer within a range of less than 20 degrees between the maximum and minimum encountered during the cooking cycle, and the best electrical or gas control thermostats now manufactured in forms suitable for these uses have a spread of at least 20 degrees between the maximum and minimum operating temperatures. It has been recognized, of course, that it is possible to produce a thermostat having considerably less range between its opening and closing points, but this has not offered a solution to the problems involved, since if such thermostats as installed in equipment as contemplated here, they "cycle" or "hunt" during the preheating period to the extent that the period required to bring the oil to cooking temperature is unnecessarily prolonged. Obviously, this results in the loss of the heating efficiency inherent in the high B. t. u. heating equipment.

The present invention departs from the prior art practices in a radical manner. By such departure, it has succeeded in providing a deep frying unit wherein the temperature of the frying fluid is held within a range of about 2 or 3 degrees, notwithstanding the fact that the range between upper and lower actuating temperatures of the commercial thermostat employed for the purpose is actually no less than 20 degrees. This seemingly anomalous result is accomplished by the unique expedient of bending a commercial tubular type thermostat bulb in such a manner that a portion of the bulb may be held in direct surface-to-surface contact with the heating element, while another portion of the bulb is submerged in the fluid being heated, but spaced from the primary heating surface. A preferred type of installation is illustrated in the drawings of this specification wherein:

Figure 1 is a side elevational view of a commercial deep fryer, with certain parts of the housing and frying vessel broken away;

Figure 2 is a plan sectional view of the frying vessel illustrated in Figure 1, showing the location and manner of installation of a thermostatic control unit in accordance with the present invention;

Figure 3 is an unretouched reproduction of a temperature curve as actually produced by the thermostatic control apparatus illustrated and described herein;

Figure 4 is an unretouched temperature curve as actually produced by the same apparatus when utilizing a thermostatic bulb located in the frying fluid in a manner considered conventional in the prior art; and Figure 5 is an enlarged detail view of the thermostat bulb and its associated parts.

A commercial deep fryer 10 has an open topped frying vessel 11 provided with a plurality of heat exchangers such as flame tubes 12 and 13 extending therethrough. Gas burners 14 are arranged to project flame columns laterally through the tubes 12 and 13 to a flue 15. The gas to the burners 14 is controlled by a thermostatic gas valve 16 governed by the tubular thermostat bulb 17 interconnected to the valve by a capillary tube 18. The valve 16 is ordinarily provided with an adjustable dial 19 by which the temperature setting of the apparatus may be increased or decreased in the conventional manner.

The installation differs from conventional practice, however, in that the thermostat bulb 17 includes one zone in direct contact with a flame tube, with another portion merely submerged in the cooking oil. The bulb 17 is mounted on a fixed mount 21 in the wall of the frying vessel, with a primary portion 17a of the bulb extending directly outwardly in a position to contact only the fluid within the vessel. The bulb is offset at the zone 17b, however, so that the end zone 17c, which may comprise about half the length of the bulb, is in direct surface-to-surface pressure contact with the external surface of one of the flame tubes 12—13. In practice, most precise results are obtained by mounting the bulb 17 with the end zone 17c held against the tube 13 with a firm yet resilient pressure, such that a sheet of ordinary bond paper may be drawn between the tube and thermostat bulb with friction sufficient to resist movement of the paper yet insufficient to tear it.

With this snug but resilient contact between a portion of the bulb and the surface of the heating tube, it has been found that the cooking oils may be raised from cold condition to cooking temperature with extreme rapidity, yet without causing the thermostat to "cycle" or "hunt." Nevertheless, the optimum cooking temperature may be maintained within a total range of 2 or 3 degrees. These results are shown in the curve of Figure 3. As previously stated, this curve is an actual performance curve made on an electric recording laboratory thermometer.

As seen from Figure 3, the temperature rise from the cold condition of the fryer is extremely rapid, raising the temperature of the cooking oil from room temperature to 360 degrees in approximately ten or twelve minutes, and holding the selected temperatures within a range of 2 or 3 degrees total (less than 2 degrees plus or minus) throughout the remainder of the test. This is in sharp contrast to the performance to be expected from the same thermostatic control illustrated. In the making of the charts of Figures 3 and 4, the entire fryer, thermostat, bulb, burners and fuel supply were identical, except that when the record of Figure 4 was made the bulb of the thermostat was not contacting the flame tube and was in contact only with the cooking fluid.

From the foregoing it should be apparent that the teachings of the present invention afford an extremely simple yet practical means for accomplishing precise control of temperature in an apparatus of high B. t. u. input. This desirable result is accomplished, moreover, without the necessity of redesign or reconstruction of thermostatic equipment commercially available to the trade. It follows that the improvement in result is accomplished without appreciable cost, and without sacrifice of the desirable characteristics of ruggedness and dependability which have been built into thermostats now commercially available.

Having thus described my invention, what I claim as new and desire to secure by United States Letters Patent is:

1. In a deep fryer including an open top frying vessel adapted to contain a quantity of cooking oil, with a heat exchanger of high thermal output within said vessel and arranged to be submerged in said cooking oil and in direct contact therewith, and a heating element for said heat exchanger, the combination of a thermostat controlling said heating element with a tubular thermostatic bulb of long, slender configuration bent intermediate its ends, with one end portion of said bulb offset from the other end portion hereof, and with one end of said bulb positioned in direct surface-to-surface contact with the aforementioned heat exchanger along only a portion of the length of said bulb, and with the offset portion of the bulb spaced substantially from the heat exchanger and submerged in and contacted only by the cooking oil within the vessel; said thermostatic bulb being mounted by its offset portion at a point remote from the heat exchanger and having the portion of the bulb engaging the heat exchanger held against said heat exchanger firmly yet resiliently by the inherent resiliency of the thermostat bulb itself.

2. In a deep fryer including an open top frying vessel adapted to contain a quantity of cooking oil, with a heat exchanger of high thermal output within said vessel and arranged to be submerged in said cooking oil and in direct contact therewith, and a heating element for said heat exchanger, the combination of a thermostat controlling said heating element with a tubular thermostatic bulb of long, slender configuration bent intermediate its ends, with one end portion of said bulb offset from the other end portion thereof, and with one end of said bulb positioned in direct surface-to-surface contact with the aforementioned heat exchanger along only a portion of the length of said bulb, and with the offset portion of the bulb spaced substantially from the heat exchanger and submerged in and contacted only by the cooking oil within the vessel.

References Cited in the file of this patent

UNITED STATES PATENTS

| 926,194 | Junkers | June 29, 1909 |
| 1,725,006 | Kelp | Aug. 20, 1929 |
| 2,500,061 | Clark | Mar. 7, 1950 |

FOREIGN PATENTS

| 277,314 | Germany | Aug. 7, 1914 |